United States Patent [19]

Corsmeier

[11] Patent Number: 5,249,877
[45] Date of Patent: Oct. 5, 1993

[54] APPARATUS FOR ATTACHING A CERAMIC OR OTHER NON-METALLIC CIRCULAR COMPONENT

[75] Inventor: Donald M. Corsmeier, Cincinnati, Ohio

[73] Assignee: The United States of America as represented by the Secretary of the Air Force, Washington, D.C.

[21] Appl. No.: 843,670

[22] Filed: Feb. 28, 1992

[51] Int. Cl.$^5$ ............................................. F16B 1/02
[52] U.S. Cl. ......................................... 403/24; 403/338; 403/409.1; 403/30
[58] Field of Search ............... 403/24, 336, 338, 335, 403/373, 374, 337, 404, 409.1, 30; 415/189, 190, 209.2, 209.3, 209.4

[56] References Cited

U.S. PATENT DOCUMENTS

| | | |
|---|---|---|
| 2,851,246 | 9/1958 | Nichols ........................... 415/190 X |
| 3,970,402 | 7/1976 | Yamashita ........................... 403/338 |
| 4,304,523 | 12/1981 | Corsmeier et al. ................. 416/221 |
| 4,375,891 | 3/1983 | Pask .................................. 415/115 X |
| 4,732,531 | 3/1988 | Minoda et al. ........................ 415/115 |
| 4,768,924 | 9/1988 | Carrier et al. ........................ 415/189 |
| 4,776,721 | 10/1988 | Lange .............................. 403/338 X |
| 4,953,282 | 9/1990 | Corsmeier et al. ................... 29/451 |
| 5,062,767 | 11/1991 | Worley et al. ..................... 415/209.3 |
| 5,127,793 | 7/1992 | Walker et al. ................... 415/189 X |

Primary Examiner—Randolph A. Reese
Assistant Examiner—Harry C. Kim
Attorney, Agent, or Firm—Robert L. Nathans; Donald J. Singer

[57] ABSTRACT

First and second annular clamping elements are coupled together by an annular clamping ring and a Belleville spring coupled to the clamping ring urges the clamping elements toward each other so that they grip the annular ceramic piece without the need to utilize fasteners which would call for the machining of the annular ceramic piece to weaken it. The clamping elements thus support the ceramic piece and can couple it to an annular gas turbine machine frame or the like.

10 Claims, 3 Drawing Sheets

APPARATUS FOR ATTACHING A CERAMIC OR OTHER NON-METALLIC CIRCULAR COMPONENT

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of coupling devices.

A ceramic component such as the centerbody of a gas turbine engine is brittle and often of lower strength than metal and therefore it does not lend itself well to being attached to the turbine frame with bolts, rivets or other fasteners that require holes in the ceramic body. These holes tend to concentrate loads on the ceramic which can cause the part to fail. What is required is an attachment that carries the centerbody load uniformly in the component.

BRIEF SUMMARY OF A PREFERRED EMBODIMENT OF THE INVENTION

First and second annular clamping cone elements are coupled together by an annular clamp ring having a preloaded Belleville spring therein which causes the cone elements to grip an interior rim of the centerbody to support it upon the turbine frame without the need to machine holes into the ceramic centerbody.

A tab arrangement is employed to prevent the spring from permanently deforming and to prevent the centerbody from breaking away from the frame in the event of a sharply increased axial load on the centerbody.

BRIEF DESCRIPTION OF THE DRAWINGS

Other objects, features and advantages will become apparent upon study of the following description, taken in conjunction with the drawings in which:

FIG. 1b illustrates a top view of a portion of FIG. 1a;

FIGS. 2-5 illustrates various steps in assembling the apparatus of FIG. 1a; and

DETAILED DESCRIPTION OF THE INVENTION

Figure 1A:
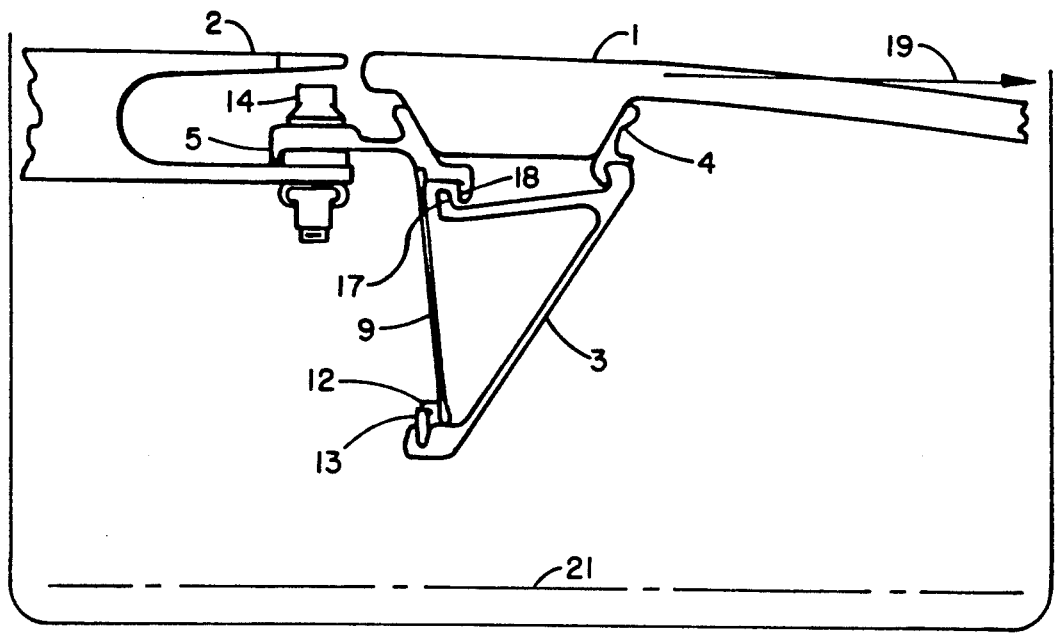
FIG. 1a illustrates a cross sectional view of a preferred embodiment of the invention.
Figure 1B:
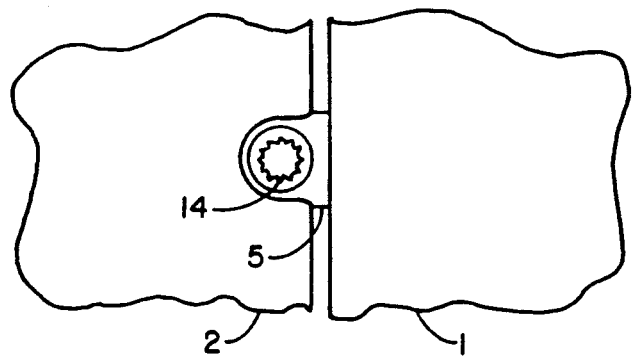

As shown in FIG. 1a, an interior rim 1' on centerbody 1 is captured between aft support cone 4 and forward support cone 5 which are pulled toward each other by the Belleville spring 9 configured in the form of an annular washer, concentric with respect to centerline 21 at the bottom of FIG. 1a. After assembly, the Belleville spring 9 is captured within clamp ring 3 and is mechanically biased to urge the support cones 4 and 5 together. The clamp member 5 is coupled to the turbine machine frame 2 by a number of bolts 14 positioned around the circumference of the annular turbine frame portion 2.

It should be understood that the clamp ring 3, support cones 4 and 5, centerbody portion 1 and the Belleville spring 9 are all concentric with respect to the turbine centerline 21. The spring 9 is configured as a large washer having an outside diameter in contact with clamp cone element 5 and an inside diameter in contact with ring retainer element 12 of clamp ring 3. The preloaded spring presses against clamp element 5 at its outer diameter and against the ring retainer 12 at its inner diameter. The retainer 12 in turn presses against split ring 13 which presses against clamp ring 3, which in turn presses against aft cone 4.

During normal operation, the pre-load in the Belleville spring 9 is greater than the axial load indicated by vector 19. If the centerbody 1 should experience an increase in the load 19, such as could be caused by an augmentor blow out load, which load 19 is greater than the spring preloaded, tabs 17 and 18 on the clamping elements 3 and 5 respectively, will prevent the spring from permanently deforming, and additionally will prevent the centerbody from breaking away from the turbine frame 2.

Hence, the stationary centerbody 1 is held concentric about centerline 21 and turbine frame 2 by the wedging action of the cones or clamping elements 4 and 5. This mounting apparatus also allows for the difference in radial thermal growth between the ceramic centerbody and the metal turbine frame. As the frame and the metal components of the apparatus expand radially outward relative to the ceramic centerbody (which expands less than the metal), the Belleville spring 9 allows the cones 4 and 5 to move apart as necessary to permit them to move radially out along the centerbody interior rim.

Figure 2:
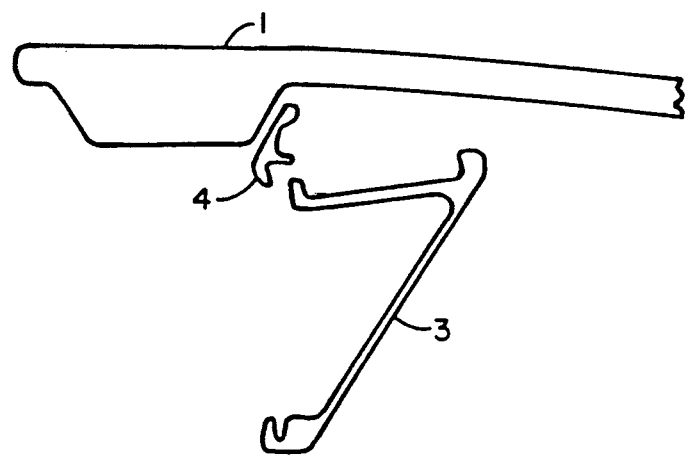
Figure 3:
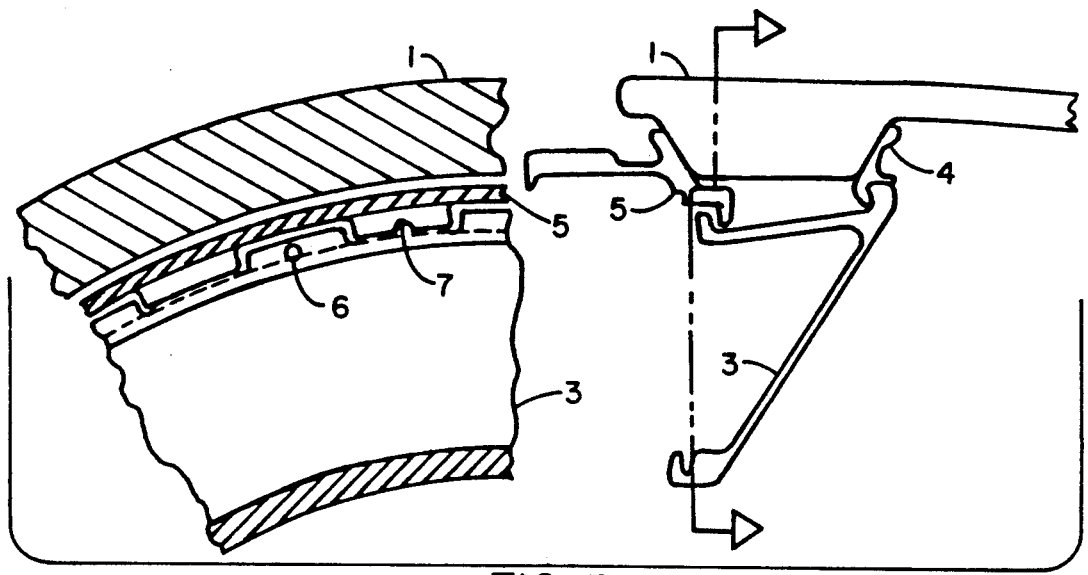
Figure 4:
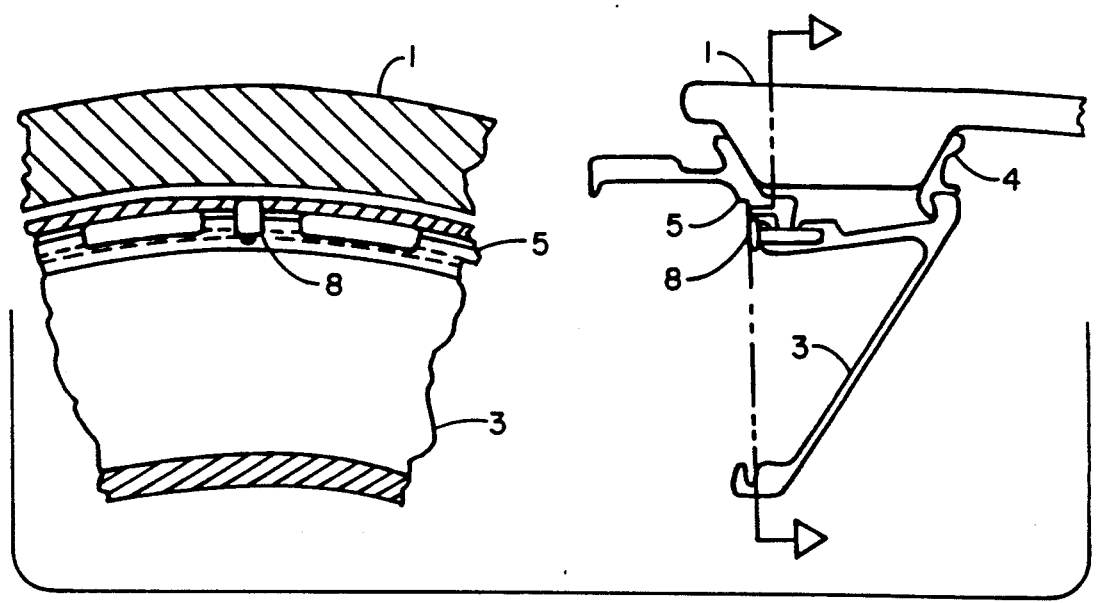

The assembly of the apparatus begins by putting the clamp ring 3 into the centerbody 1 and the aft cone 4, made up of two annular half rings, is then put into the centerbody; see FIG. 2. Aft cone 4 is then installed on clamp ring 3. This assembly is then positioned against the aft surface of the centerbody interior rim and the forward support cone or clamping element 5 is then placed into the centerbody and then rotated so that hole 6 in the clamp ring 3 aligns with slot 7 in the forward support ring 5. See FIGS. 3 and 4. Pin 8 is then installed to prevent rotation of clamp ring 3 relative to clamping element 5. Note that the head on pin 8 fits into a small pocket in clamping element 5. When the spring 9 is installed, it will keep the pin 8 from escaping.

Figure 5:
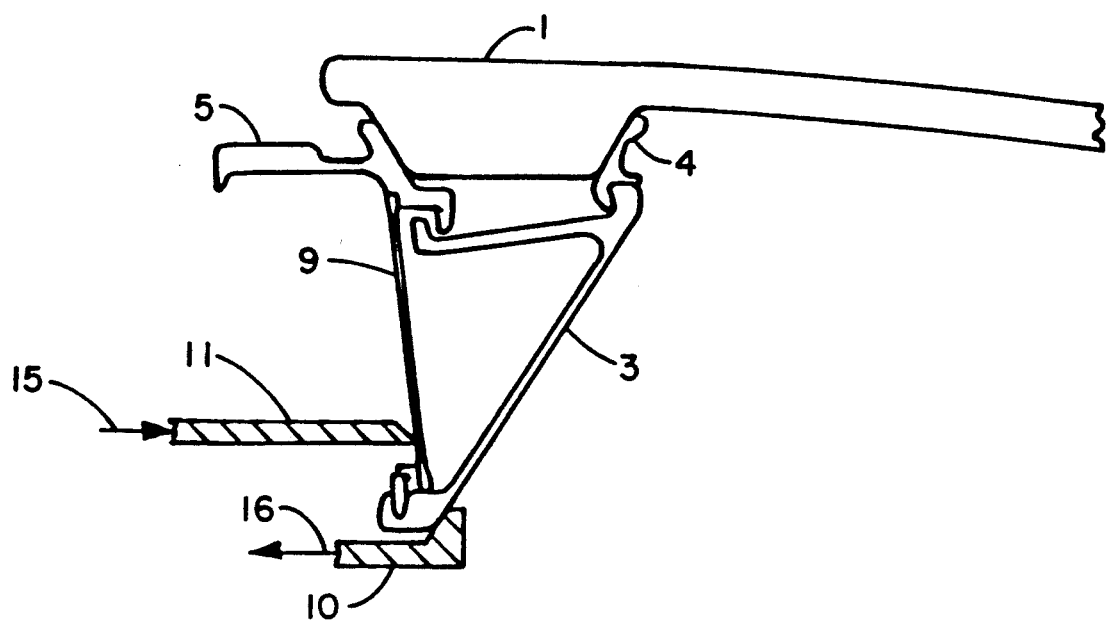
Figure 6:
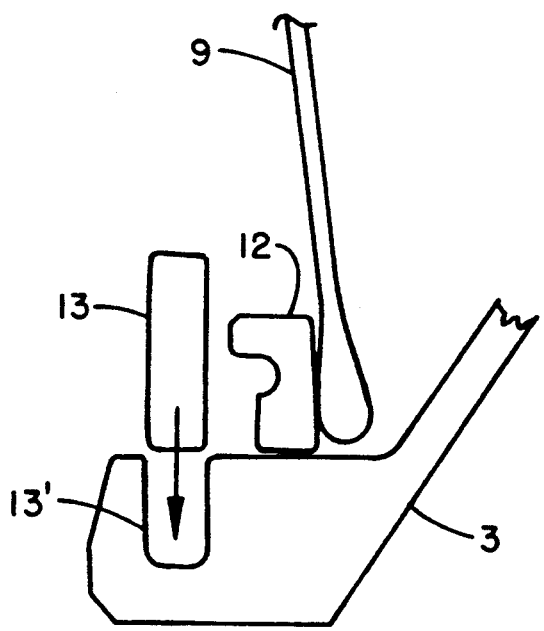
FIG. 6 illustrates a detailed portion of FIG. 5.

As shown in FIG. 5, spring 9 is placed within clamp ring 3 and is deflected by tools 10 and 11 that are loaded in the direction of vectors 16 and 15. Ring retainer 12 is positioned against spring 9 and the split ring 13 is installed in groove 13' in clamp ring 3. Tool 15 is now released, which allows the ring retainer 12 to push against, as well as capture, split ring 13. Finally, the centerbody assembly is attached to the turbine frame by bolts 14 which are positioned circumferentially about the annular turbine frame.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. Apparatus for coupling a first non-machinable annular member to a second annular member comprising:

(a) first and second annular clamping elements coupled together by an annular clamp ring;

(b) an annular preloaded spring element retained within said clamp ring for spring biasing said annular clamping elements toward each other to cause said first and second annular clamping elements to grip said first non-machinable annular member; and (c) wherein said annular pre-loaded spring element is configured in the form of a washer having a large centrally positioned hole therein, an outside diameter portion of said washer contacting an outside diameter portion of said clamp ring and an inside diameter portion of said washer contacting an inside diameter portion of said clamp ring.

2. The apparatus of claim 1 wherein said annular pre-loaded spring element comprises a Belleville spring.

3. Apparatus for coupling a first non-machinable annular member to a second annular member comprising:

(a) first and second annular clamping elements coupled together by an annular clamp ring;

(b) an annular preloaded spring element retained within said clamp ring for spring biasing said annular clamping elements toward each other to cause said first and second annular clamping elements to grip said first non-machinable annular member, and (c) wherein said annular pre-loaded spring element comprises a Belleville spring.

4. Apparatus for coupling a first non-machinable annular member to a second annular member comprising:

(a) first and second annular clamping elements coupled together by an annular clamp ring, said annular clamp ring being coupled to said second annular member; and (b) mechanical biasing means coupled to said clamp ring for mechanically biasing said annular clamping elements toward each other to cause said first and second annular clamping elements to grip said first non-machinable annular member; and (c) wherein said mechanical biasing means is configured in the form of a springy washer having a large centrally positioned hole therein, an outside diameter portion of said washer contacting an outside diameter portion of said clamp ring and an inside diameter portion of said washer contacting an inside diameter portion of said clamp ring.

5. The apparatus of claim 4 wherein said mechanical biasing means comprises a Belleville spring.

6. Apparatus for coupling a first non-machinable annular member to a second annular member comprising:

(a) first and second annular clamping elements coupled together by an annular clamp ring, said annular clamp ring being coupled to said second annular member;

(b) mechanical biasing means coupled to said clamp ring for mechanically biasing said annular clamping elements toward each other to cause said first and second annular clamping elements to grip said first non-machinable annular member; and (c) wherein said mechanical biasing means comprises a Belleville spring.

7. Apparatus for coupling a first non-machinable annular member to a second annular member comprising:

(a) first and second annular clamping elements coupled together by an annular clamp ring, said annular clamp ring being coupled to said second annular member;

(b) mechanical biasing means coupled to said clamp ring for mechanically biasing said annular clamping elements toward each other to cause said first and second annular clamping elements to grip said first non-machinable annular member; and (c) wherein one of said annular clamping elements is coupled to a machine frame, thereby to support the first member; and (d) wherein said mechanical biasing means is configured in the form of a springy washer having a large centrally positioned hole therein, an outside diameter portion of said washer contacting an outside diameter portion of said clamp ring and an inside diameter portion of said washer contacting an inside diameter portion of said clamp ring.

8. The apparatus of claim 7 wherein said mechanical biasing means comprises a Belleville spring.

9. The apparatus of claim 7 further including a first set of tabs coupled to said machine frame and a second set of tabs coupled to said annular clamp ring and aligned with said first set of tabs for preventing the spring element from permanently deforming in the event of a sharp increase in the axial load upon the first annular member.

10. Apparatus for coupling a first non-machinable annular member to a second annular member comprising:

(a) first and second annular clamping elements coupled together by an annular clamp ring, said annular clamp ring being coupled to said second annular member;

(b) mechanical biasing means coupled to said clamp ring for mechanically biasing said annular clamping elements toward each other to cause said first and second annular clamping elements to grip said first non-machinable annular member; and (c) wherein one of said annular clamping elements is coupled to a machine frame, thereby to support the first member; and (d) wherein said mechanical biasing means comprises a Belleville spring.

* * * * *